United States Patent [19]

Lutoff

[11] Patent Number: 5,504,906
[45] Date of Patent: Apr. 2, 1996

[54] MANAGING STRUCTURED OBJECTS USING GLOBAL DEFINITIONS

[75] Inventor: Daniel Lutoff, St. Martin d'Heres, France

[73] Assignee: Bull S.A., Paris, France

[21] Appl. No.: 495,307

[22] Filed: Jun. 27, 1995

Related U.S. Application Data

[63] Continuation of Ser. No. 245,890, May 19, 1994, abandoned, which is a continuation of Ser. No. 943,937, Sep. 11, 1992, abandoned.

[30] Foreign Application Priority Data

Sep. 13, 1991 [FR] France ..................... 91 11341

[51] Int. Cl.$^6$ ............... G06F 17/30; G06F 9/06; G06F 9/40; G06F 9/44
[52] U.S. Cl. ........... 395/700; 364/283.3; 364/286; 364/DIG. 1; 395/600
[58] Field of Search .................... 395/650, 700

[56] References Cited

U.S. PATENT DOCUMENTS

| | | | |
|---|---|---|---|
| 5,093,914 | 3/1992 | Coplien et al. | 395/700 |
| 5,119,475 | 6/1992 | Smith et al. | 395/156 |

FOREIGN PATENT DOCUMENTS 9103791  3/1991  WIPO .

OTHER PUBLICATIONS

"Compliers Principles, Techniques, and Tools", A. V. Aho et al., 1986, Addison Publishing Co., U.S.A., pp. 364–375.
"The Waite Group's C++ Programming", J. T. Berry, 1989, Gary Masters Editor, U.S.A. pp. 107–116.

*Primary Examiner*—Alvin E. Oberley
*Assistant Examiner*—Michael T. Richey
*Attorney, Agent, or Firm*—Weingarten, Schurgin, Gagnebin & Hayes

[57] ABSTRACT

A process for managing structured objects by an application interface which can furnish a plurality of services. The application interface defines a set of functions and a set of structured objects in public and private forms represented by descriptors and arranged in different classes, each class having a description. The application interface offers service primitives including parameters defined by the objects, and is also useable with other interfaces at different levels. The process uses a representation of private-objects that is substantially identical to the representation of public-objects, the parameters thus being generically handled, a public-object being represented by a descriptor table and a private-object being represented by a descriptor list. Additionally, the process uses a catalog organized according to a list of the various classes supported which allows the functions of the application interface to be automated.

2 Claims, 2 Drawing Sheets

MANAGING STRUCTURED OBJECTS USING GLOBAL DEFINITIONS

This application is a continuation of U.S. application Ser. No. 08/245,890, filed May 19, 1994, which is a continuation of U.S. application Ser. No. 07/943,937, filed Sep. 11, 1992 (now all abandoned).

FIELD OF THE INVENTION

The invention relates to a process for managing structured objects.

BACKGROUND OF THE INVENTION

A known process for managing structured objects, the objects being mainly complex information, is described in the document: "API to OSI Object Management (XOM) X/Open Preliminary Specification (1990)" published by "X/Open" Jointly with "X.400 API Association." In general, the representation of a private object includes two parts: a generic part which includes header information, and a specific part which concerns the actual or effective representation of the object, and hence of a parameter associated with the object.

In a solution proposed by OSF in the document "API to Directory Services (XDS) X/Open Preliminary Specification (1990)" published by "X/Open" jointly with "X.400 API Association," the actual representation of the private object corresponds to the output parameter, namely the parameter calling up the service to which the objects are to be transmitted (relocated). This service is composed of a set of functions or libraries that can be called up to process the various parameters or objects, and in this service a parameter is a particular structure, so that according to the solution, the representation of a private object corresponds to this structure. This solution has drawbacks, chief among which is that the handling of private objects or parameters is not independent of the definition of these objects, which results in excessive complication of processing and decreased efficiency of the process. Indeed, when a plurality of objects is to be processed, each function used must be applied to each of the objects which corresponds to a particular structure, and the number of operations then quickly becomes excessive.

In addition, still according to this solution, each class is represented uniquely by a description specific to it, and when an object is handled it is necessary to know this class to find out what particular structure corresponds to the object in question. This has the major drawback of a further complication in processing, preventing the various applied functions from being automated.

SUMMARY OF THE INVENTION

A process for managing structured objects using an application interface is provided that furnishes a plurality of services, defines a set of functions, defines a set of structured objects in public and private forms where objects are represented by descriptors and are arranged in different classes, where each class has its own description. Also, service primitives are provided that have parameters defined by the objects, the interface being designed to be used with other application interfaces.

The structured object management process of the invention uses a private-object representation which is substantially identical to the public-object representation so that the parameters are handled in generic fashion, a public object being represented by a table of descriptors, and a private object being represented by a list of descriptors. Also, a catalog organized according to a structure specifies a global definition for various supported classes taken from a list of all classes in order to automate the various functions of the application interface.

Thus, the process of the invention involves choosing an actual representation of private objects that is almost identical to the public representation; characteristically, the public object is represented by a table of descriptors and the private object by a list of descriptors. This choice makes it possible for the private objects to be handled independently of the definition of the objects. Despite the fact that an intermediate internal representation (the list of descriptors) must be used before making the relocation to the desired service, at which point the number of operations would in principle appear to be larger, efficiency is nevertheless improved by considerably simplifying the processing of the objects, since once the list of descriptors is established, all the functions are applied fully automatically and independently of the classes. In this case, private representation consists of dealing only with the generic part concerning the header, and doing so for each of the functions, after which the only operation required is a single relocation of the whole object to the desired service, the relocation operation being the operation most harmful to efficiency. In this way, the interface is used efficiently.

In addition, the list of classes supported, presented in a catalog, provides independence from the definition of a class. Since the class-linked semantic aspect is no longer a concern, it is no longer necessary to know the class handled to find out what particular structure is to be filled: one need only go through the list without stopping at the nature of the information. Thus the situation is substantially generic, and handling is therefore automatic. Moreover, the catalog allows the application interface to be independent of the service, since it is only necessary to fill the catalog with the service parameters.

Utilization of a catalog is of great importance in the process of the invention: private representation is substantially identical to public representation. Indeed, the catalog allows one to fill the internal representation of the objects in the most systematic and efficient way possible, because it furnishes a description outside the classes. The catalog itself is filled automatically from the specifications which are simply scanned to fill the catalog. When the specifications are changed, the catalog is automatically regenerated.

The resulting improvement in performance can be explained as follows. In the prior art, the question was how to fill the particular structure if there are N classes and X functions to fill —there are N procedures for fulfilling a given function since each of N classes has its own representation of each function, and therefore NX procedures for fulfilling all of the functions. According to the present invention, using an intermediate internal representation, i.e., the list, the X functions are fulfilled automatically so that there are X class-independent procedures. Then, to go onto the particular structure for N classes there are N procedures, namely (N+X) procedures in all. Since there are at least X=6 functions to be fulfilled systematically, the gain in the number of procedures is already significant for only N=2 classes, thus in the following simple exemplary case:

process of prior art: NX=12 procedures, process according to the invention: N+X=8 procedures.

Another useful feature of the invention relates to syntactic checking of objects. The actual representation of an object is a list of descriptors, so that this list can be compared with the description of a class. This allows for automatic checking of an object against its specification and allows for a general checking procedure to be furnished. In the prior art, a check must be made for each particular structure.

DESCRIPTION OF THE DRAWING

The invention will be more fully understood from the following detailed description, in conjunction with the accompanying figures, in which.

DETAILED DESCRIPTION OF A PREFERRED EMBODIMENT

Figure 1:
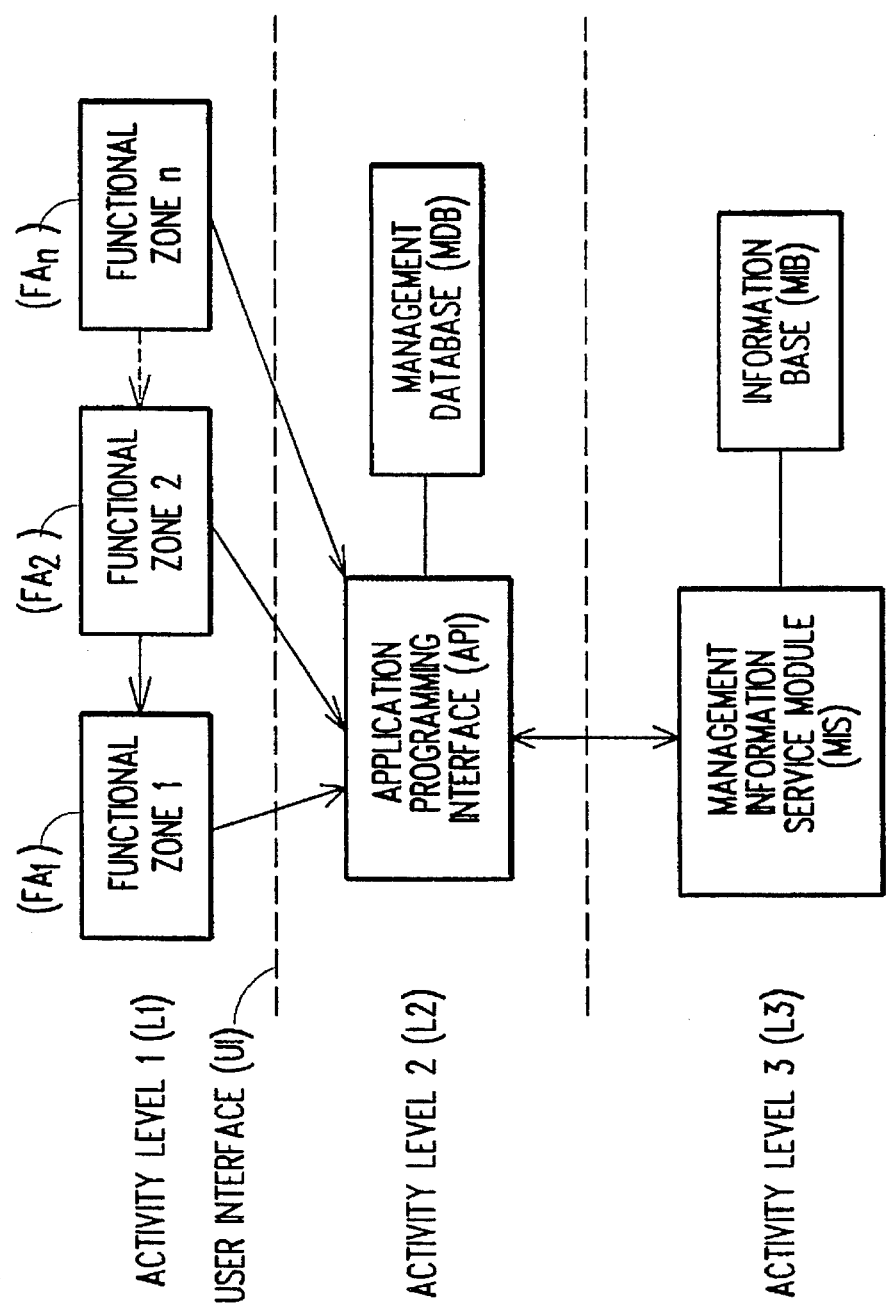
FIG. 1 is a block diagram of an architecture of an application in which the structured object management process is used.

FIG. 1 provides an example of the architecture of an application and summarily describes the environment in which the structured object management process of the invention is used. FIG. 1 shows an application broken down into three activity levels L1, L2, and L3. The first level L1 contains the management applications grouped into functional zones, FA1, FA2, . . . , FAn, each management application supplying a set of services solely to its functional zone. The user interface UI contains all the necessary functions for giving the user access to administrative information, giving the user an opportunity to carry out administrative operations, and giving the user channels for accessing the signals of the managed objects.

The second level L2 contains services common to one or more management applications. The management database MDB contains all the administrative information which is not con,dined in the management information base MIB, and is managed at level L2. Level L2 contains, for example, an application interface API that manages the structured objects to which the process of the invention is applied.

Third level L3 contains all the standard functions that provide access to the information base MIB. The information base MIB represents a set of managed objects relating to one administration application. A management information service module MIS furnishes services for transmitting or receiving informational management messages which are propagated in a network.

Each level is designed to be independent of the level above. Therefore, the modules in level L2 are independent of user interface UI, for example. This independence has a number of advantages. In particular, it allows for modular applications, parallel developments, facilitated maintenance, and extension possibilities, as well as offering the possibility of using user interface UI for independent applications.

To further clarify the invention, some information and definitions relating to terminology and concepts used in the field of application of the invention are given below.

Object management involves handling complex information. It provides the programmer with a uniform model of information based on group concepts, object classes, or the like, as explained below.

The application interface is used to manage information organized as a plurality of structured objects. It is intended to be used with other application interfaces for transferring messages or offering the management services of a system. Such an interface defines a set of functions and a set of structured objects, and is organized to allow multiple distinct operations administered by independent users. Each user is able to handle objects of a particular species, which is made possible through the concept of work spaces.

A service is created and used to allow objects, which may be public or private, to be handled under the direction of a user. A public object is represented by a data structure whose format is contained in the service specification. Hence, the user handles public objects directly by means of programming languages. Public objects themselves are of two kinds: those that are generated by the user, and those that are generated by the service. A private object is represented with its own specificity. Thus, the user accesses private objects only indirectly through application interface functions.

An object can contain information elements known as attributes, themselves containing elements representing the type of attribute and values assigned to this attribute, each value being accompanied by a whole number relating to its syntaxes. A value corresponds to an information element which can be considered to be a characteristic or a property of the object of which it is a part. The syntax corresponds to a category in which a value is placed relative to its form. The type corresponds to a category in which all the values of an attribute related to their destination are located.

The user and the service exchange values by means of descriptors. Normally, a descriptor comprises a value, which may sometimes be absent, as well as indices (whole numbers) relating to its syntax, its type, and its representation.

The object attributes are not ordered, while the values of these attributes are ordered.

The objects are arranged by class on the basis of their destination and internal structure. An object is said to be an instance of a class when it is characterized by the types of attributes that can appear in the instances of the class.

Allied classes are grouped into collections called functional blocks represented by an object identifier.

A work space is a storage directory of instances of classes of one or more functional blocks associated with the work space. Implementation of application interface functions may differ from one work space to another. In addition, one functional block can be associated with each work space.

In general, an object is accessed by means of an object handler. An object handler is the means by which a user provides an object to the service as an argument of a function of the application interface, and the service returns an object to the user as the result of a function of the interface.

Returning to FIG. 1, the application interface API offers service primitives, and allows access to the management information service module MIS to process or handle the managed objects.

The database MIB is a directory of management information. It is structured as a collection of managed objects which the programs can access through the interface to authorize questions, updates, and reports. Also, the interface is structured so as to establish an MIS module model to facilitate dialoging.

The management system includes a collection of open systems which cooperate to save management information relating to managed objects contained in database MIB. Users can read or modify this information, which is typically used to monitor, check, harmonize, or configure objects that pertain to application programs, peripherals, networks, etc. The management information is structured in terms of managed objects with their attributes, management operations that can be applied to the objects, and information that the objects can emit. The set of managed objects with its attributes constitutes the information base MIB. Each managed object belongs to a specific class which forms the set of objects sharing the same set of attributes, the same information to be emitted, and the same management operations. An object identifier serves to reference the class of the managed object. Likewise, the attribute is an element of the information which describes a property of the managed object; the value associated with this attribute can have a simple or complex structure.

In its architecture, the interface API is connected on one side at level L1 to a user program and at the other side at level L3 with the communications infrastructure of the MIS module which furnishes the communication functions. An input/output channel is associated with each started session, and this channel is used to transmit asynchronous requests and to receive any associated confirmations or other information. Another single channel is set up at the lower level (at level L3) of interface API. The interface API is dedicated to transmission of synchronous requests and to reception of any associated confirmations. In this way, the interface API does not have to store any information transmitted asynchronously by the communications infrastructure.

Figure 2:
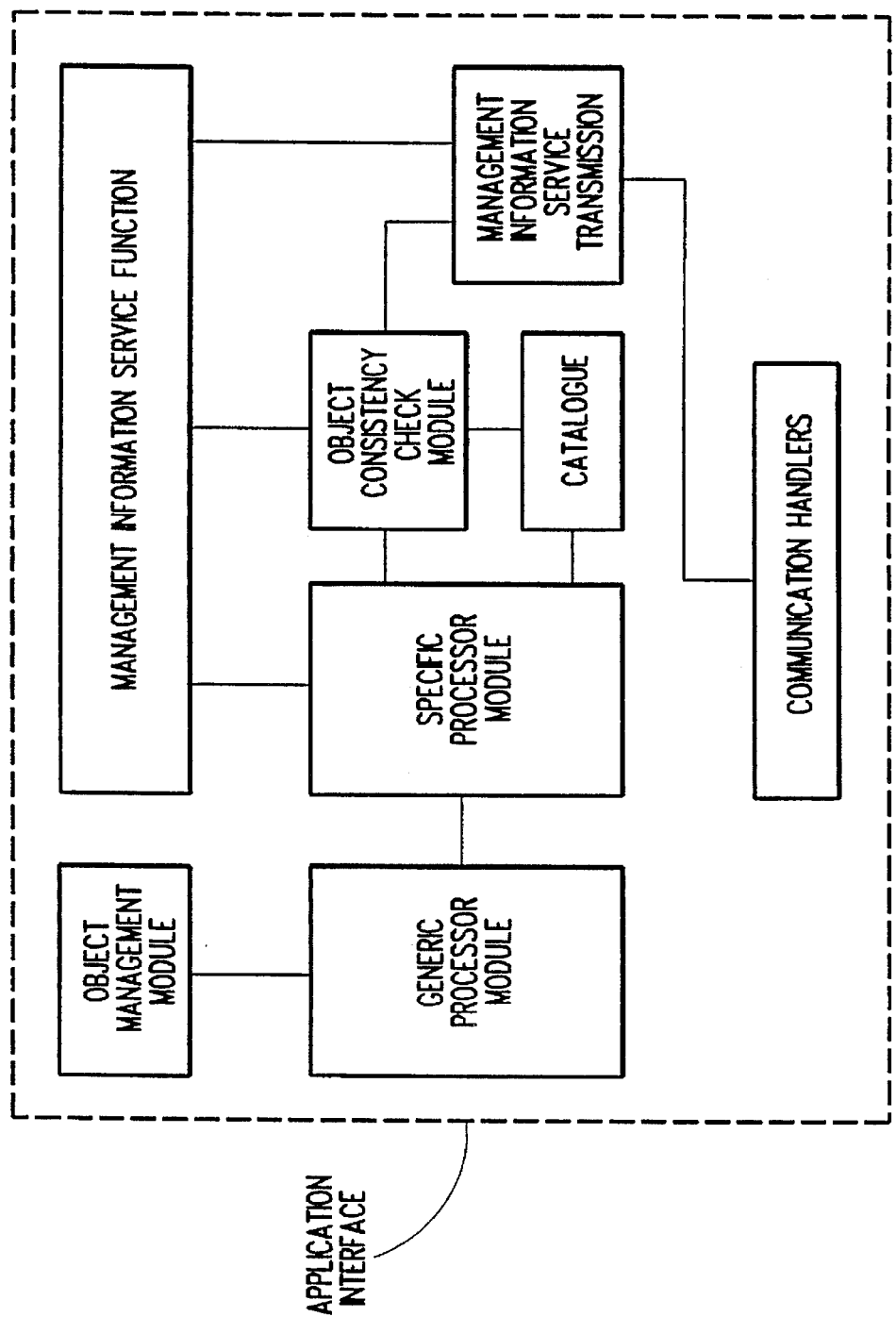
FIG. 2 is a block diagram of an example of the internal architecture of the application interface of FIG. 1.

FIG. 2 describes the architecture for the application interface API. The interface API can be broken down into modules described below summarily and then in detail. A first module OMC processes the managed objects generically. In this module OMC, the private objects and public objects generated by the service are created, modified, and deleted by means of functions OMF specific to object management. This module has the task of preserving consistency between all the object representations, and this consistency is obtained by means of handlers. The OMC module creates, links, and unlinks the handlers which are used to handle the objects.

A second module OMG processes the managed objects in specific fashion. The task of this module OMG is to handle all the representations of private objects received from the OMC module, the object representations themselves being used by the management information service functions SMSF. For this purpose, it memorizes knowledge relating to the creation modification, and deletion of all the classes specific to management information services.

A third module CAT includes a catalog of the various classes supported. This module CAT is cooperative with the module OMG and contains in particular a description of all the classes relating to object management and relating to management information services. This description serves as a template to facilitate automation of the various functions applied to the managed objects.

A fourth module SMSC is cooperative with the OMG, SMSF, and CAT modules; its task is to check consistency between the input objects and their utilization when the SMSF functions are applied. For this purpose, it must check the information and make sure that the operations performed on the private or public objects have been correctly executed. In addition, the SMSC module also supports any other specific check on SMSF functions.

A fifth module SMST is cooperative with the SMSC and SMSF modules, and serves to transmit or relocate the managed objects to the service at level L3 by means of communications handlers CH. Moreover, when a message is to be sent to module MIS (see FIG. 1) or when a user desires to receive a message, a match of elements must be made between the private or public objects and the interface structures of the communications infrastructure; this element matching task is also assigned to the SMST module.

Regarding the private objects processed in the OMC module, their representation has two parts: a header whose structure is described in detail below, and an actual representation described thereafter.

The private objects are accessible only through the OMF functions. A private object is defined by a header which contains two descriptors, the object type which is the class subidentifier, a link to keep together all the private subobjects of this private object, and a pointer to the corresponding object processed by the SMSF functions.

The two header descriptors are referenced as elements 0 and −1. Descriptor −1 contains: private object links which keep all the private objects in the work space together, and the pointer of the work space used. Descriptor 0 contains: the class attribute of this private object, and two bits in the syntax indicating that this object is private. Descriptor 0 is known to the user while descriptor −1 is unknown to the user. The external representation of a private object checks descriptor 0 by means of a pointer while the user is unaware of the existence of descriptor −1.

For public objects, a distinction must be made between two types of objects: generated public objects set by the service, which the user cannot modify, and generated public objects set by the user, which the user can manage and modify freely.

The internal representation of public objects generated by the service corresponds to a descriptor table. A first descriptor referenced −1 contains a pointer of the work space, and a second descriptor referenced 0 contains information specific to the public objects generated by the service.

The external representation of a public object generated by the service checks descriptor 0 by means of a pointer, while the user is unaware of the existence of descriptor −1.

The internal representation (seen by the service) and external representation (seen by the user) of a public object generated by the user are fully identical. They are represented by a descriptor table. The user is not involved in the setting of descriptor −1, and the service does not have to refer to it.

More information will now be provided regarding the structure of the internal data of the work space. The service keeps the private objects in the work space which is a directory of class instances. The work space interface provides a macrodefinition for each function in the service interface which uses data structures defined for implementation of functions appropriate to the specific arguments.

Concerning the representation of private objects in the OMG module, the management process uses a private object representation which is substantially identical to the public representation such that the parameters are handled generically, a public object being represented by a descriptor table, while a private object is represented by a descriptor list.

The private representation allows the OMF function to be simplified in two ways. First, only the operations in the list (e.g., insertion or deletion of an element into or from the list) are necessary to implement any OMF function and second, implementation of all the OMF functions is independent of the class definition. Since the interface can define a large number of object classes (over 160) it is very important to automate the OMF functions applied to the private objects.

A module CAT is provided which is a catalog organized according to a structure that specifies a, global definition of the various classes supported from a list of all the classes for the purpose of automating the various OMF functions of the application interface.

The use of such a catalog has a number of advantages. First, the class hierarchy can easily be maintained. Second, when an attribute is modified, the modification made is reflected immediately and automatically for all the subclasses concerned. Moreover, when a class attribute also concerns other classes, these classes can share this same attribute, and when its definition is modified, this modification is reflected in all the classes sharing this attribute. Finally, the class instances are made independent of the class definition.

The SMST module, a module which relocates the managed objects to the service in level 3, carries out an essential task: to implement the element match between the input and output parameters of the SMSF functions and the interface structures of the communications infrastructure. When a message must be sent to the communications infrastructure, an element match must be made between the input objects that relate to the management information services and the higher interface of the communications infrastructure. Likewise, when a message coming from the communications infrastructure is received, an element match must be carried out between the Higher interface of the communications infrastructure and the output objects relating to the management information services.

For this purpose, the SMST module includes two submodules:

a descending submodule which contains the functions that match input elements of the management information services with those of the appropriate interface structure of the communications infrastructure, each managed-object functional block being associated with a separate submodule; and an ascending submodule which contains the functions matching the elements in the interface structure of the communications infrastructure with those of the appropriate output objects relating to management information services, each managed-object functional block also being associated with a separate submodule.

The managed objects are relocated by the SMST module by means of communications handlers CH, the purpose of which is to organize communications with the communications infrastructure. For this purpose, functions internal to the handlers CH are defined so as to establish or eliminate the connection with the communications infrastructure and to send or receive information.

The SMSC module checks for consistency between the input objects and their utilization when the SMSF functions are applied; for this purpose it collects the results of the checking operations on the service primitives relative to the management information services. It checks the input parameters and makes any specific checks. A checking function is associated with each management information service primitive. Also, the checking function centralizes all the checks specified by the interface. A function is also provided to check the validity of the syntax of an object relative to the management information services. Its purpose is to ensure that the object has been formatted independently of the SMSF functions. It uses the internal data structures of the classes relative to the managed objects and to the management information services.

The main OMF functions relative to the managed objects and applied by the OMC module are described below and comprise:

Copying a private object, including the steps of:

defining a header for the new private object from the set of object headers, defining objects relating to management information services referenced in the original object, taken from the set of corresponding objects, copying information from the original object to the new object; new memory locations depending on the attribute values may be considered (object chains, type of attribute with several values, etc.), and for a copy successfully executed, returning the new object handler to the output parameter, failing which an error code is returned.

Copying a chain between private objects, including the steps of:

checking the input parameters, for the type of source specified, finding the value that conforms to the position of the source value, for the type of destination specified, finding the value that conforms to the position of the destination value, copying the chain from the source to the destination; this copy places or replaces the chain in the destination object, with the syntax of the copy being the same as that of the source, and if the copy is unsuccessfully executed, returning an error code.

Creating a private object, including the steps of:

checking the validity of the input parameters (class, work space, etc.), defining an object header from the set of object headers, defining the object relative to the management information services from the corresponding set of objects, initializing the object header (descriptor −1 and 0, object type, and object pointer relative to the management information services), initializing the initial values of the object relative to the management information services (if the initialization parameter of the object is correct), and if creation is successfully accomplished, returning the object handler created in the output parameter (object); otherwise an error code is returned.

Creating a handler: this function allows a private-object header to be created for the object specified relative to the management information services, and includes the following steps:

checking the validity of the class, defining an object header from the set of object headers, initializing the object header (description −1 and 0, object type, and object pointer relative to the management information services), and if the creation is successful, returning an object handler to the output parameter (object), otherwise an error code is returned (poor class choice, insufficient memory).

Decoding the result of a private coded object, including the steps of:

checking the validity of the class, creating a private object corresponding to the class of the coded object, once a creation has been executed, calling up the coding program, and returning a success message.

Deleting a private object or a public object generated by the service, including the steps for public objects generated by the service, releasing the descriptors and resources taken up by the attribute values, this release being applied recursively to all the public subobjects (it has no effect on the private subobjects), the cleared space being reinserted into the appropriate free lists, for private objects, releasing the object header, corresponding object relative to the management information services, and the resources taken up by the attribute values, this release being applied recursively to all the private subobjects which can have a header to be released; the header of the released object and the object relative to the management information services are reinserted into appropriate free lists, and for a nonexecuted deletion, returning an error code.

Coding a private object, including the steps of:

checking the validity of the class, creating a private coded object, for an executed creation, calling up the coding program, and returning a success message.

Obtaining copies of the attribute values of a private object, including the steps of:

checking the input parameters (exclusions, included types, initial value, limitation value), evaluating the number of descriptors according to the required exclusions (types and values), if the exclusion of descriptors is specified, the "total number" parameter is reupdated with this evaluated number and returns to the function, defining the evaluated number of descriptors (−1 and 0) and terminal descriptors from the set of descriptors (these descriptors being contiguous), initializing the descriptors −1 and 0, according to the required exclusions, initializing each descriptor with the type and syntax of the attribute, copying the value from the original object; if exclusion of the values is specified, no value is copied; if the exclusion is multiple and if the attribute has more than one value, no value is copied; if the syntax of the value is a chain while a chain is defined from the set of chains before copying, if the syntax value is an object and exclusion of subobjects is specified while an object header is defined from the set of object headers and is initialized, referring to this private subobjects; if the syntax of the value is an object and exclusion of subobjects is not specified while the function is applied to this subobject, the value referencing the descriptor 0 of this public subobject, and if this fails, then the handler of the created public object is returned to the output parameter (copy), otherwise an error code is returned.

Testing an object class, including the steps of:

checking the validity of the check (the functional block must be supported by the work space and the class must exist), if the class attribute is equal to the class parameter, then validate the output parameter of the instance and return a success message, otherwise check if the class is a subclass of the class specified (a list of classes is associated with each functional block, each class has a list of its own subclasses, and the classes and subclasses are marked by an object identifier), and if the class is an instance of a subclass of a class parameter, then validate the output parameter of the instance, otherwise invalidate it (in either case, the function emits a success message).

Placing attribute values in a private object (the source can be private or public, with a specific code existing in both cases), including the steps of:

initially, checking certain input parameters, the others being checked upon request, and for each attribute type, apply the required modification to the destination object; for a value insertion, define the memory zone of the set corresponding to the syntax of the appropriate value before copying the value; for a value replacement, the source values are substituted for the specified destination values (release or allocation of a memory zone is possible).

Reading the chain segment into a private object, including the steps of:

checking the input parameters, for the specified type, finding the value of the element to be read according to the value position input parameter and the element parameter, copying the number of elements, the destination buffer register and the maximum chain length to be read being specified in the element parameters, and if successful, updating the element position with either the position following the last element read or zero if the value of the final element has been read; updating the chain lengths with the number actually read.

Removing attribute values from a private object, including the steps of:

checking the input parameters; the type must be valid and the number of remaining values must conform to the specification, releasing data on specified values (subobjects, chains) from storage; if the value is an object, the deletion function is applied to it and the space occupied by the attribute values is reinserted into the appropriate free list, removing the attribute if no value remains, and if removal is unsuccessful, returning an error code.

Writing a chain segment in a private object, including the steps of:

checking the input parameters;

for the specified type, finding the value of the element to be written according to the value position input parameter and element position parameter; if the position of the value equals the number of values present, the segment is inserted into the attribute as a new value (in this case the new value has the syntax specified; otherwise the syntax argument is ignored), copying the number of elements (the source buffer register and length of chain to be written are specified in the element parameters), and if successful, updating the element position with the position following the last element written and the chain length of the attribute value of the object concerned.

The main memory management functions are described below and comprise:

Initialization including the steps of:

defining and initializing the data structures used by the memory management (since the basic data structure is a table with an input for each type of data structure, no set objects is allocated at this level), and returning the value 1 if the memory location is insufficient.

Defining or allocating standard data structures including the steps of:
  detaching one or more contiguous blocks from the free list, and returning a pointer designating them, the standard parameter being used to select the right set,
  defining the set and allocating it to the first function callup,
  re-executing the function if the free list is empty, and
  returning the value 0 if the memory location is insufficient.

Releasing standard data structures, including the steps of:
  associating the blocks containing the data structures in the free list, and
  when possible, recombining the released blocks with the nearest block.

Definition or allocation and copying the specified chain, including the steps of:
  detaching one or more contiguous blocks (depending on the chain length) from the free list, these blocks being installed according to the chain value and a pointer designating them being returned,
  allocating the whole (set) to the first function callup,
  re-executing the function if the free list is empty, and
  returning the value 0 if the memory location is insufficient.

Releasing the specified chain, including the steps of:
  in the free list, reassociating the contiguous blocks which contain the chain, and
  when possible, recombining the blocks released with the nearest block.

In addition, the principal or primitive SMSF functions relating to the management information service interface are listed below (for further details, see "Consolidated Management API Specification" Version 1.0, May 1, 1991, published by BULL S. A. and submitted to OSF and to X/Open, in which these functions are described); the SMSF functions comprise:
  locally aborting (at interface) the result of an operation or a piece of information that is confirmed but on hold, being executed asynchronously,
  requesting an action to be executed by managed objects,
  responding to an action request,
  opening a management session,
  cancelling a result of a request-to-obtain operation of the ordered type on hold, being executed asynchronously,
  responding to a cancellation of a request-to-obtain operation,
  requesting creation of a new managed object,
  responding to a creation request,
  requesting deletion of a managed object,
  responding to a deletion request,
  returning an error message describing a particular error,
  requesting an information report emitted by a managed object,
  responding to the management information report request,
  requesting that a piece of management information be obtained,
  responding to a request to obtain management information,
  requesting that the argument of a management operation (or information) be received, or that the result of a management operation (or information) be recovered, executed asynchronously,
  requesting modification (replacement, removal, addition) of attribute values of a managed object,
  responding to a modification request,
  closing (setting aside, aborting) a work space,
  initializing the interface,
  releasing a management session, and
  establishing the characteristics of the interface and service.

The SMSC module also has functions for checking the SMSF functions or primitives; these functions include:
  checking the validity of the input parameters and any other checks specific to the SMSF abort function,
  checking the validity of the input parameters and any other check on the SMSF action request function,
  checking the validity of the input parameters and any other checks specific to the SMSF response to an action request function,
  checking the validity of input parameters and any other checks specific to the SMSF open management session function,
  checking the validity of input parameters and any other checks specific to the SMSF cancel a result function,
  checking the validity of input parameters and any other checks specific to the SMSF response to cancellation function,
  checking the validity of input parameters and any other checks specific to the SMSF creation request function,
  checking the validity of input parameters and any other checks specific to the SMSF response to creation request function,
  checking the validity of input parameters and any other checks specific to the SMSF request for deletion function,
  checking the validity of input parameters and any other checks specific to the SMSF response to request for deletion function,
  checking the validity of input parameters and any other checks specific to the SMSF request for report function,
  checking the validity of input parameters and any other checks specific to the SMSF response to request for report function,
  checking the validity of input parameters and any other checks specific to the SMSF request to obtain copies function,
  checking the validity of input parameters and any other checks specific to the SMSF response to request to obtain copies function,
  checking the validity of input parameters and any other checks specific to the SMSF function that requests obtaining an argument or retrieving the result of an operation,
  checking the validity of input parameters and any other checks specific to the request for modification SMSF function,
  checking the validity of input parameters and any other checks specific to the response to modification request SMSF function, and
  checking the validity of input parameters and any other checks specific to the "close management session" SMSF function.

The SMST module also uses a specific set of functions, the main functions including:

A descending submodule including:

downward relocation of an instance of a class of managed objects in the appropriate information block of the communications infrastructure interface structure, and downward relocation of the input parameters to the appropriate interface structure of the communications infrastructure.

An ascending submodule including:

relocation of an information block in the communications infrastructure interface to an instance of a class of managed objects, and relocation of communications infrastructure interface structures to the appropriate managed-object instance.

The object handlers CH also use a set of functions, including:

opening an input/output channel with the communications infrastructure, closing the input/output channel previously opened, sending a message to the communications infrastructure over a previously opened input/output channel, receiving a message coming from the communications infrastructure over a previously open input/output channel, and standing by to receive a message coming from the communications infrastructure over a previously opened input/output channel.

Finally, the OMG module advantageously uses original functions relative to the managed objects which will be described below.

When the OMF functions applied to the OMC module have allowed the link to be updated, by means of private-object handlers CH, the OMG module must effect The actual representation of the private objects. In order to separate handling by means of handlers CH, which is independent of the class definition of the managed objects from the application of functions to obtain the actual representation, an interface of functions used by the OMG module has been defined for each function.

Thus, remarkably, the object management process of the invention uses an interface of functions among which the creation switching function includes finding the class description of the object in the catalog, then checking the result of this search and, if the initialization parameter of the corresponding object is correct, creating attributes for the class concerned and the hierarchically higher classes in the case of inheritance, the initial values being found in the catalog.

Also, the object management process of the invention uses an interface of functions among which the decoding switching function includes finding the object class in the catalog, checking the match, decoding the value, and finally creating and initializing the corresponding object.

Also, the object management process of the invention uses an interface of functions among which the deletion switching function includes, for each descriptor, deleting the subobjects when they exist, and the chain when it exists, and then deleting the current object.

Also, the object management process of the invention uses an interface of functions among which the coding switching function includes finding the object class in the catalog and checking the match, then coding the value, and finally creating the coded object.

Also, the object management process of the invention uses an interface of functions among which the copy obtaining switching function includes, for each exclusion, retaining only the necessary attributes by restoring the other attributes, calculating the number of descriptors, allocating the memory location, then copying the information.

Also, the object management process of the invention uses an interface of functions among which the "testing a class of objects" switching function includes finding the class in the catalog, and then checking that the object belongs to this class or a hierarchically higher class, in the case of inheritance.

Also, the object management process of the invention uses an interface of functions among which the switching function for placing attribute values in the object includes, if the source object is a public object, converting it into a private representation, then finding the description of the destination object in the catalog and, for each source object attribute, placing the attribute values in the destination object as a function of the modification required.

It should also be noted that the function interface used by the process does not have switching functions of the following types:

"copying an object"; to accomplish this, the process calls on OMF functions of the "obtaining copy" and "placing attribute values in object" type, "copying a chain between private objects"; to accomplish this, the process calls on OMF functions of the "obtaining copy," "creating a private object," and "placing attribute values in object" type, "reading a chain segment in a private object"; to accomplish this, the process calls on the OMF function of the "obtaining copy" type, "removing attribute values from a private object"; to accomplish this, the process calls on the OMF functions of the "obtaining copy" and "placing attribute values in object" types, and "writing a chain segment in a private object"; to accomplish this, the process calls on OMF functions of the "obtaining copy" and "placing attribute values in the object" types.

In addition, a syntax check function is used in the OMG module to check the validity of the syntax and hence correct formatting of the object.

To conclude, the structured-object management process of the invention is particularly advantageous in that it allows private objects to be handled independently of their definition, thereby improving efficiency and considerably simplifying object processing. Once the list of descriptors is established, all the functions are applied in a fully automatic fashion, independently of the classes, so that the interface is used more efficiently. Moreover, the choice of a catalog which contains the list of supported classes gives independence from the definition of a class, as the semantic aspect linked to the class is no longer a concern. Because of this choice, a generic quality is achieved, so that handling is automatic and the application interface is independent of the service, as the catalog is simply filled with service parameters. In addition, the fact that the catalog is filled automatically from the specifications, the specifications being simply scanned to fill the catalog, automatically causes regeneration of the catalog when specifications are changed. Finally, in addition to the very substantial increase in performance involved in the use of the process of the invention, syntactic checking of objects is advantageously obtained, allowing an object to be checked automatically against its specification, thereby supplying a global checking procedure.

Other modifications and implementations will occur to those skilled in the art without departing from the spirit and the scope of the invention as claimed. Accordingly, the above description is not intended to limit the invention except as indicated in the following claims.

What is claimed is:

1. A process for managing structured objects in an application program, the application program being executed by a computer system wherein the application program includes an application interface that supplies a plurality of services, defines a set of functions and defines a set of structured objects in public and private forms accessed by descriptors and arranged in different classes and wherein the application interface offers service primitives, each service primitive including a plurality of parameters each of the plurality of parameters defined by the structured objects and adapted for use with at least one application interface, the process comprising the steps of:

generating a private-object representation of an object wherein the private-object representation of the object corresponds to a public-object representation of the object;

fulfilling with a single procedure each of a plurality of different functions provided by a corresponding plurality of different objects, each of the different objects having a private object representation of the object wherein the private object representation of the is the same as a public object representation of the object and wherein the public-object is represented by a descriptor table, and the private-object is represented by a descriptor list; and maintaining a catalog containing a global definition of every class structure existing in the computer system and wherein the catalog has stored therein service parameters which provide a description of an object regardless of the class of the object.

2. A process for managing structured objects in an application program, the application program being executed by a computer system wherein the application program includes an application interface that supplies a plurality of services, defines a set of functions and defines a set of structured objects in public and private forms accessed by descriptors and arranged in different classes and wherein the application interface offers service primitives, each service primitive including a plurality of parameters each of the plurality of parameters defined by the structured objects and adapted for use with at least one application interface, the process comprising the steps of:

establishing a table of descriptors to represent a public-object representation of a first object;

establishing a list of descriptors to represent a private-object representation of the first object;

selecting an actual representation of the private object wherein the actual representation is substantially the same as the public representation of the private object to thereby allow the private object to be processed independently of the definition of the object wherein the private-object representation of the object corresponds to the public-object representation of the object;

fulfilling each of a plurality of functions provided by diverse objects with a single procedure; and maintaining a catalog specifying a global definition of every class structure existing in the computer system to facilitate automation of application-interface functions.

* * * * *

UNITED STATES PATENT AND TRADEMARK OFFICE
CERTIFICATE OF CORRECTION

PATENT NO. : 5,504,906
DATED : April 2, 1996
INVENTOR(S) : Daniel Lutoff

It is certified that error appears in the above-identified patent and that said Letters Patent is hereby corrected as shown below:

Column 3, line 37, "con,dined" should read --contained--.

Column 6, line 64, "a, global" should read --a global--.

Column 7, line 22, "the Higher" should read --the higher--.

Column 8, line 64, "the steps" should read --the steps of:--.

Column 13, line 35, "effect The" should read --effect the--.

Signed and Sealed this

Sixteenth Day of May, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 5,504,906
DATED : April 2, 1996
INVENTOR(S) : Daniel Lutoff

It is certified that error appears in the above-identified patent and that said Letters Patent is hereby corrected as shown below:

Column 3, line 37, "con,dined" should read --contained--.

Column 6, line 64, "a, global" should read --a global--.

Column 7, line 22, "the Higher" should read --the higher--.

Column 8, line 64, "the steps" should read --the steps of:--.

Column 13, line 35, "effect The" should read --effect the--.

Claim 1, should read:
--1. A process for managing structured objects in an application program, the application program being executed by a computer system, wherein the application program includes an application interface that supplies a plurality of services and service primitives, defines a set of functions, defines a set of structured objects in public and private forms wherein the structured objects are each accessed by descriptors and arranged in different classes wherein each service primitive includes a plurality of parameters, wherein each of the plurality of parameters is defined by the structured objects and adapted for use with the application interface, the process comprising the steps of:

UNITED STATES PATENT AND TRADEMARK OFFICE
CERTIFICATE OF CORRECTION

PATENT NO. : 5,504,906
DATED : April 2, 1996
INVENTOR(S) : Daniel Lutoff

Page 2 of 4

It is certified that error appears in the above-identified patent and that said Letters Patent is hereby corrected as shown below:

generating a private-object representation of each of a plurality of different objects, wherein each private-object representation is comprised of a list of sequential descriptors as used in an associated public-object representation of the respective object in which the descriptors are arranged in a table, said sequential descriptors each having an associated pointer field providing a pointer to a next sequential descriptor;
        maintaining a catalog containing a global definition of every class structure supported by the applications interface, wherein the catalog has stored therein service parameters which provide a description of an object regardless of the class of the object, the service parameters stored in the form of said lists of sequential descriptors which comprise said private-object representations; and
        fulfilling, with a single procedure, each of a plurality of different application interface functions on said plurality of different objects, independent of a definition of each of said different objects, by applying said different functions to said lists of sequential descriptors which comprise said private-object representations.--.

UNITED STATES PATENT AND TRADEMARK OFFICE
CERTIFICATE OF CORRECTION

PATENT NO. : 5,504,906
DATED : April 2, 1996
INVENTOR(S) : Daniel Lutoff

Page 3 of 4

It is certified that error appears in the above-identified patent and that said Letters Patent is hereby corrected as shown below:

Claim 2, should read:
--2.  A process for managing structured objects in an application program, the application program being executed by a computer system wherein the application program includes an application interface that supplies a plurality of services, defines a set of functions and defines a set of structured objects in public and private forms
accessed by descriptors and arranged in different classes and wherein the application interface offers service primitives, each service primitive including a plurality of parameters each of the plurality of parameters defined by the structured objects and adapted for use with at least one application interface, the process comprising the steps of:
establishing a table of descriptors to represent a public-object representation of a first object;
establishing a list of descriptors to represent a private-object representation of the first object, wherein said descriptors of said table and said list are identical, wherein said list is comprised of a sequence of said descriptors, and wherein each descriptor has an associated pointer pointing to a next descriptor in said list;

UNITED STATES PATENT AND TRADEMARK OFFICE
CERTIFICATE OF CORRECTION

PATENT NO. : 5,504,906
DATED : April 2, 1996
INVENTOR(S) : Daniel Lutoff

It is certified that error appears in the above-identified patent and that said Letters Patent is hereby corrected as shown below:

maintaining a catalog specifying a global definition of every class structure supported by the application interface to facilitate automation of application-interface functions, wherein the global definitions comprise service parameters in the form of said list of sequential descriptors which comprise said private-object representations; and
      fulfilling each of a plurality of said application interface functions upon diverse objects with a single procedure by applying said functions to said object-independent list of descriptors.--.

Signed and Sealed this

Seventeenth Day of October, 2000

Attest:

Attesting Officer

Q. TODD DICKINSON

Director of Patents and Trademarks